US010275851B1

(12) United States Patent
Zhao et al.

(10) Patent No.: US 10,275,851 B1
(45) Date of Patent: Apr. 30, 2019

(54) CHECKPOINTING FOR GPU-AS-A-SERVICE IN CLOUD COMPUTING ENVIRONMENT

(71) Applicant: EMC IP Holding Company LLC, Hopkinton, MA (US)

(72) Inventors: Junping Zhao, Beijing (CN); Layne Peng, Shanghai (CN); Jie Bao, Shanghai (CN); Kun Wang, Beijing (CN); Yifan Sun, Abington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/496,568

(22) Filed: Apr. 25, 2017

(51) Int. Cl.
*G06T 1/20* (2006.01)
*G06T 1/60* (2006.01)
*G09G 5/00* (2006.01)

(52) U.S. Cl.
CPC ............... *G06T 1/20* (2013.01); *G06T 1/60* (2013.01); *G09G 5/006* (2013.01)

(58) Field of Classification Search
None
See application file for complete search history.

(56) References Cited

U.S. PATENT DOCUMENTS

| 6,888,831 | B1 | 5/2005 | Hospodor et al. |
| 8,938,416 | B1 | 1/2015 | Cole et al. |
| 9,836,354 | B1* | 12/2017 | Potlapally ............ G06F 11/1438 |
| 9,984,648 | B2* | 5/2018 | Chakraborty .......... G09G 5/003 |
| 2008/0195843 | A1 | 8/2008 | Muniandy |
| 2009/0089560 | A1 | 4/2009 | Liu et al. |
| 2011/0131430 | A1 | 6/2011 | Krishnamurthy et al. |
| 2012/0011401 | A1* | 1/2012 | Ranganathan ...... G06F 11/1484 714/19 |
| 2014/0198112 | A1 | 7/2014 | Miyamoto et al. |
| 2014/0325073 | A1 | 10/2014 | Urbach |
| 2015/0213163 | A1 | 7/2015 | Yang et al. |
| 2015/0271331 | A1 | 9/2015 | Segre et al. |

(Continued)

OTHER PUBLICATIONS

Minsoo Rhu et al., "vDNN: Virtualized Deep Neural Networks for Scalable, Memory-Efficient Neural Network Design," 49th IEEE/ACM International Symposium on Microarchitecture (MICRO-49), 2016, 13 pages.

(Continued)

*Primary Examiner* — YuJang Tswei
(74) *Attorney, Agent, or Firm* — Ryan, Mason & Lewis, LLP

(57) ABSTRACT

Techniques are provided to configure a graphics processing unit (GPU) service platform to provide GPU processing and checkpointing services to a client system. For example, when the GPU service platform receives a service request from a first client system for GPU processing services, a GPU server node is allocated to execute a first GPU processing task associated with the service request using one or more GPU devices. When a GPU checkpointing operation is performed during execution of the first GPU processing task to generate a checkpoint image of a current state of the first GPU processing task, the GPU server node is configured to execute at least a portion of a second GPU processing task associated with a second service request received from a second client system, using the one or more GPU devices concurrently with performing the GPU checkpointing operation for the first GPU processing task.

20 Claims, 6 Drawing Sheets

(56) References Cited

U.S. PATENT DOCUMENTS

| | | | |
|---|---|---|---|
| 2015/0317192 A1 | 11/2015 | Munshi et al. | |
| 2016/0247248 A1* | 8/2016 | Ha | G06F 9/455 |
| 2017/0220949 A1 | 8/2017 | Feng et al. | |
| 2017/0293758 A1 | 10/2017 | Saxena et al. | |
| 2017/0353397 A1 | 12/2017 | Che | |
| 2018/0075347 A1 | 3/2018 | Alistarh et al. | |

OTHER PUBLICATIONS

Tensorflow, "Tensor/Tensorflow," https://github.com/tensorflow/tensorflow/blob/master/tensorflow/python/training/saver.py, 2015, 32 pages.

S. Han et al., "Deep Compression: Compressing Deep Neural Networks with Pruning, Trained Quantization and Huffman Coding," arXiv:1510.00149v5, Published as a conference paper at International Conference on Learning Representations (ICLR), Feb. 16, 2016, 14 pages.

Tony Paikeday, "Seven Service Providers Delivering the GPU-Accelerated Cloud—Built on NVIDIA GRID," https://blogs.nvidia.com/blog/2016/09/27/the-gpu-accelerated-cloud/, Sep. 27, 2016, 4 pages.

amazon.com, "Linux Accelerated Computing Instances," http://docs.aws.amazon.com/AWSEC2/latest/UserGuide/using_cluster_computing.html, 9 pages.

Tiffany Trader, "Microsoft Puts GPU Boosters on Azure Cloud," https://www.hpcwire.com/2016/09/29/microsoft-puts-gpu-boosters-on-azure-cloud/, Sep. 29, 2015, 3 pages.

U.S. Appl. No. 15/391,223 filed in the name of Yifan Sun et al. on Dec. 27, 2016 and entitled "Queue-Based GPU Virtualization and Management System."

U.S. Appl. No. 15/498,055 filed in the name of Junping Zhao et al. on Apr. 26, 2017 and entitled "Intelligent Data Coordination for Accelerated Computing in Cloud Environment."

U.S. Appl. No. 15/487,887 filed in the name of Yifan Sun et al. on Apr. 14, 2017 and entitled "Managing Access to a Resource Pool of Graphics Processing Units Under Fine Grain Control."

\* cited by examiner

100

400

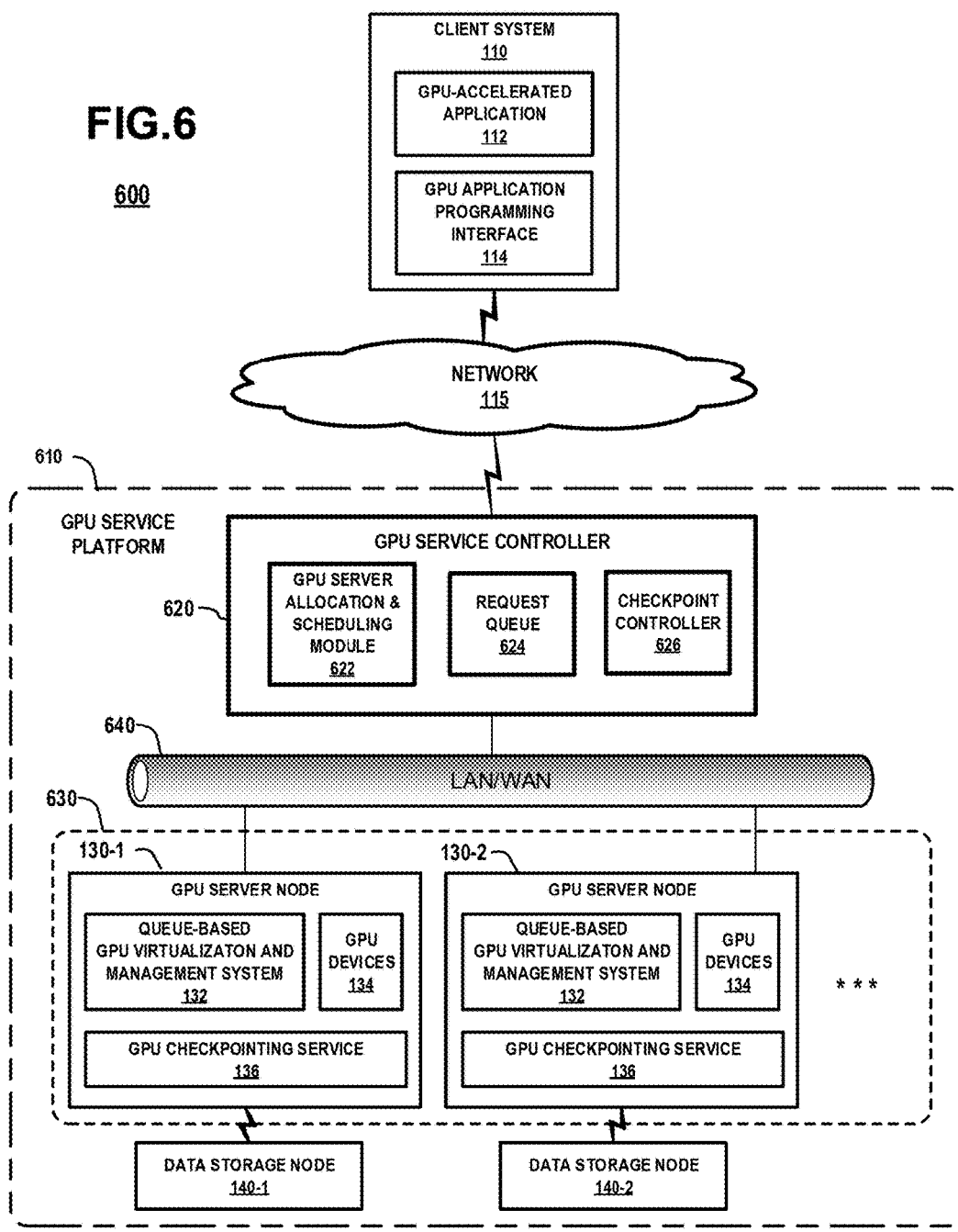

CHECKPOINTING FOR GPU-AS-A-SERVICE IN CLOUD COMPUTING ENVIRONMENT

FIELD

This disclosure relates generally to techniques for managing and utilizing graphics processing units in a cloud computing service environment.

BACKGROUND

Various types of special-purpose processors, such as graphics processing units (GPUs) for general purpose computing, have been developed to accelerate the processing of specific types of workloads. Architecturally, a GPU has a massively parallel architecture which typically comprises hundreds or thousands of cores that are configured to concurrently execute hundreds or thousands of threads at a given time. This is in contrast to a standard central processing unit (CPU) architecture which typically comprises a few cores and associated cache memory, which are optimized for sequential serial processing and handling a few software threads at a given time.

The processing capabilities of GPU resources are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning (ML), deep learning (DL), data mining, video data transcoding, image analysis, image recognition, virus pattern matching, augmented reality, encryption/decryption, weather forecasting, big data comparisons, and other applications with computational workloads that have an inherently parallel nature.

Due to the high-throughput and low energy consumption per operation exhibited by GPUs, it is anticipated that GPU-as-a-Service (GPUaaS) will become mainstream in the near future, wherein cloud-based systems will implement GPU powered blades for various types of processing. Since GPU workloads are typically characterized by long running, heavy computing intensive tasks that can last for hours, days or even weeks to execute certain tasks, it would be beneficial to checkpoint GPU state in a GPUaaS environment to avoid having to re-execute GPU processing tasks in the event that such tasks are prematurely terminated for some reason (e.g., power failure).

SUMMARY

Illustrative embodiments of the invention generally include systems and methods for configuring a GPU service platform to provide GPU processing and checkpointing services to a client system which utilizes the GPU service platform. For example, in one embodiment, a method comprises: receiving, by a GPU service platform, a service request from a client system for GPU processing services provided by the GPU service platform, wherein the GPU service platform comprises a GPU server node, wherein the GPU server node comprises one or more GPU devices; executing, by the GPU server node, a first GPU processing task associated with the first service request using the one or more GPU devices; performing, by the GPU server node, a GPU checkpointing operation during execution of the first GPU processing task to generate a checkpoint image of a current state of the first GPU processing task; and executing, by the GPU server node, a second GPU processing task associated with a second service request received from a second client system, using the one or more GPU devices; wherein at least a portion of the second GPU processing task is executed by the GPU server node concurrently with performing the GPU checkpointing operation for the first GPU processing task.

Other embodiments of the invention include, without limitation, systems and articles of manufacture comprising processor-readable storage media.

BRIEF DESCRIPTION OF THE DRAWINGS

FIG. 6 is a high-level schematic illustration of a computing system which implements a GPU service platform that is configured to provide GPU processing and checkpoint services to multiple client systems over a cluster of GPU server nodes, according to another embodiment of the invention.

DETAILED DESCRIPTION

Figure 1:
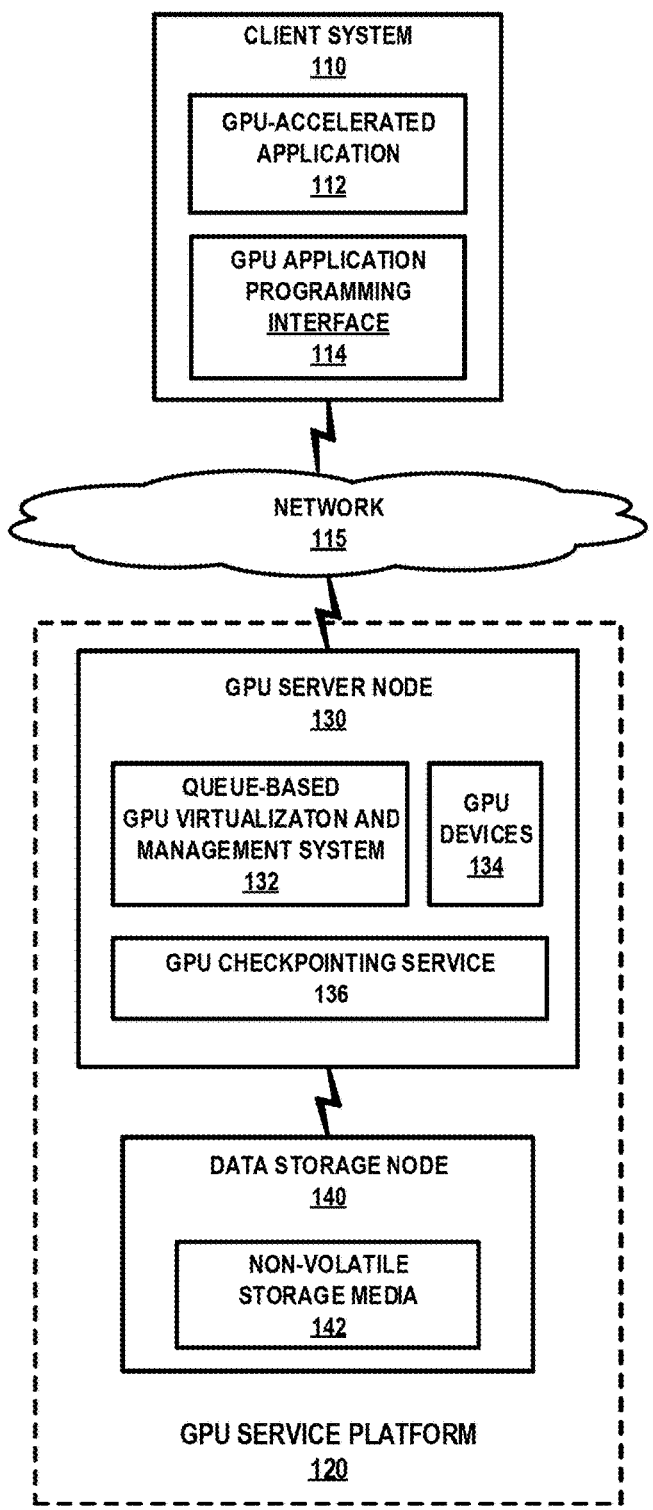
FIG. 1 is a high-level schematic illustration of a computing system which implements a GPU service platform that is configured to provide GPU processing and checkpoint services to a client system, according to an embodiment of the invention.

Illustrative embodiments of the invention will now be explained in further detail with regard to systems and methods for configuring a GPU service platform to provide GPU processing and checkpointing services to client systems that utilize the GPU service platform. Embodiments of the invention provide multiple solutions for implementing GPU checkpointing services as part of a GPUaaS system which provides GPU processing services for high performance computing (HPC) applications such as Deep Learning analytics, etc., wherein the checkpointing solutions are designed to minimize or avoid any impact on GPU computing performance in a cloud environment. As will be explained in further detail below, various GPU checkpointing services according to embodiments of the invention are designed for different use cases, wherein the alternative checkpointing services can be integrated and work together to provide optimal checkpointing functionality. In general, checkpointing systems according to embodiments of the invention include: (i) a conversation-based checkpointing service which is utilized for client GPU-accelerated application programs that are not configured to issue explicit checkpointing commands, (ii) a client-driven GPU checkpointing service for client GPU-accelerated application programs that are configured to issue explicit checkpointing commands which are handled by the GPU checkpointing service implemented in the GPU service platform; and (iii) a multi-layer queue-based checkpointing system that is configured to provide checkpoint services to multiple client systems over a cluster of GPU server nodes in a multi-service cloud environment.

In a HPC domain, long running, heavy computing intensive tasks dominate the workloads of GPU resources, and such intensive GPU processing tasks can last for hours, days or even weeks to execute certain tasks (e.g., train models) and deliver results. It is common for a GPU server and a GPU client to experience some error at some point during the execution of a relatively long GPU processing task, or otherwise have the GPU processing task preempted at some point in the execution to execute a higher priority task. Such error can range from software error, memory failure, power failure, or even natural disasters. Recovering a GPU computing result by re-executing the program from the beginning to the break point is generally not a good solution due to the long running time of the GPU processing task and the heavy computing power requirement. Therefore, checkpointing the calculation result by saving a current program state in non-volatile storage is a more optimal solution to make the system robust and failure tolerant.

Checkpointing in a cloud environment faces many challenges. Such challenges include, but are not limited to, long synchronization overhead, large data movement over the network, significant use of system resources such as system memory and storage bandwidth, etc. In this regard, checkpointing in a cloud computing environment militates against single point checkpointing, wherein all the data is collected at one place and stored. Indeed, Big data applications can involve TB level of data, and transferring the data repeatedly to one machine for checkpointing wastes computation power, network bandwidth, and storage. These issues are addressed by cloud-based checkpointing schemes according to embodiments of the invention, wherein service providers (e.g., GPU service providers) are configured to perform local checkpointing operations and store the checkpointing results to an optimal location, to thereby achieve optimal performance.

Another challenge with GPU checkpointing on GPUaaS is how to store a GPU state without knowledge of the CPU program information. In a GPU cloud environment, the central CPU code is executed client-side and only those portions of the program code that need to be accelerated by GPU processing are transferred to a GPU server node for execution on a GPU device. However, the GPU execution is not stateless, parts of the program states are usually stored in the GPU memory. One simple solution is to use CPU checkpointing only, while every time the CPU performs a checkpointing, the CPU retrieves all the GPU state from the GPU server. However, this solution will suffer from significant performance issue while the GPU memory (can be in GB level) needs to be transferred back from the GPU repeatedly.

Another problem with GPU checkpointing arises in the context of a multi-GPU server system. In a conventional solution, when a checkpointing operation is initiated, every GPU device on the given server must stop execution of GPU processing tasks, and the checkpointing process begins when the CPU acquires the control flow. In accordance with embodiments of the invention as discussed below, to improve the CPU-GPU system performance, the CPU and GPU execution is overlapped, wherein the CPU continues with other CPU tasks once the GPU task is submitted, and does not wait for the GPU task to complete. When checkpointing multiple GPUs, all CPU threads are suspended to guarantee that the stored state is synchronized.

An additional challenge to GPU checkpointing arises in the context of a multi-client support by a GPU cloud service environment. In one simple solution, when one client system requests checkpointing, all other client systems would have to wait for the checkpointing task to finish. The simple solution adds unnecessary latency to other client systems connecting to the GPU server for GPU processing tasks. Moreover, in a cloud environment, different accelerators can be provided as services, wherein the services span across many different server nodes and reside in multiple cloud platforms. Checkpointing the states of all the services is a significant challenge due to the long synchronization overhead, and the long pause for not being able to continue execution on any of the service providers.

Checkpointing services according to embodiments of the invention address these challenges by optimizing checkpointing performance in a GPUaaS cloud environment. With a conversation-based checkpointing system, we allow checkpointing a GPU state without the intervention of the user and the client program. With an explicit client-driven checkpointing system, a GPU server can perform GPU processing tasks for other client systems while checkpointing the GPU state of a GPU processing task for a given client system. In addition, during a checkpointing stage, the CPU on the client system can continue processing other tasks. The multi-layer queue based approach allows different service providers (e.g., different GPU server nodes) to take a snapshot of the system state at the same moment without long synchronization overhead.

FIG. 1 is a high-level schematic illustration of a computing system which comprises a GPU service platform that is configured to provide GPU processing and checkpoint services to a client system, according to an embodiment of the invention. The computing system 100 comprises a client system 110, a communications network 115, and a GPU service platform 120. The client system 110 comprises a GPU-accelerated application 112, and a GPU application programming interface (API) 114. The GPU service platform 120 comprises at least one GPU server node 130, and at least one data storage node 140. The GPU server node 130 comprises a queue-based GPU virtualization and management system 132, one or more GPU devices 134, and a GPU checkpointing system 136. The data storage node 140 comprises non-volatile storage media 142 to provide persistent data storage for the GPU server node 130, for example, to store checkpoint images of GPU memory and other associated information that is generated by the GPU checkpointing system 136. The non-volatile storage media 142 may include one or more different types of persistent storage devices such as HDDs (hard disk drives) or SSDs (solid-state drives), or other types and combinations of non-volatile memory. In one embodiment, the data storage node 140 is implemented using, for example, an enterprise-class storage platform comprising high performance, scalable storage arrays, which can be implemented for hyper-scale computing systems.

The client system 110 generically represents any type of user computing device such as a desktop computer, a laptop computer, an electronic tablet, or any other type of client computing device having computing resources (e.g., processor, memory, etc.) to store and execute the GPU accelerated application 112, and the GPU API 114. In another embodiment, the client system 110 may comprise a server in a data center. The client system 110 is configured to access GPU resources, which are provided by the GPU service platform 120 over the communications network 115, to execute certain portions or kernels of the GPU-accelerated application 112, as will be discussed in further detail below.

While the communications network 115 is generically depicted in FIG. 1, it is to be understood that the communications network 115 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the communications network 115 in some embodiments comprises combinations of multiple different types of communications networks each comprising network devices configured to communicate using Internet Protocol (IP) or other related communication protocols. The communications network 115 comprises intermediate points (such as routers, switches, etc.) and other elements that form a network backbone to establish communication paths and enable communication between network endpoints.

In the client system 110, the GPU-accelerated application 112 comprises an application program having compute-intensive portions or routines (e.g., compute kernels) which are included within the program code of the GPU-accelerated application 112, and which are offloaded to a GPU device for accelerated computing. It is to be understood that the term "GPU-accelerated application" as used herein refers to any type of software application, including desktop applications, server applications, database applications, and mobile applications, which comprise executable GPU-related program code that is compiled for processing by high throughput accelerators such as GPUs.

The GPU API 114 comprises library functions and protocols that are configured to communicate with the GPU service platform 120 to access GPU processing services provided by GPU service platform 120. For example, the GPU API 114 is configured to transmit a service request to the GPU service platform 120 to request GPU processing services provided by the GPU service platform 120. In addition, the GPU API 114 is configured to transmit blocks of application code (e.g., compute kernels) of the GPU-accelerated application 112 and any associated data, which are to be processed by the GPU server node 130 allocated by the GPU service platform 120 to handle the service request. The GPU API 114 also comprises routines to handle local GPU-related processing such as executing GPU application code, manipulating data, handling errors, etc.

In one embodiment, the GPU API 114 is implemented as an extension to a commercially available GPU API platform such as CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. In one embodiment of the invention, the GPU API 114 comprises "shim" layers of a standard, commercially available API. As is known in the art of computer programming, a shim layer is a library that transparently intercepts API calls and modifies arguments that are passed for a given operation, handles the operation itself, or redirects the operation to another entity. In this regard, the GPU API 114 may comprise shim layers that are utilized to extend the functionality of an existing API (e.g., CUDA) to implement the functionalities of the GPU API 114 as described herein.

While FIG. 1 provides a generic illustration of the GPU service platform 120, it is to be understood that the GPU service platform 120 can be any type of private or public cloud computing platform. For example, GPU service platform 120 may comprise a data center or otherwise be implemented within a data center. Furthermore, while one GPU server node 130 is shown in FIG. 1 for ease of illustrations, it is to be understood that the GPU service platform 120 may comprise a cluster of GPU server nodes that are located within a single data center, or distributed over two or more data centers or multiple locations of a cloud computing platform. The GPU server node 130 may implement one of many types of commercially available server systems including, but not limited to, a Windows server, a Sun Solaris server, an HP server, a Linux server, etc.

Moreover, while only one data storage node 140 is shown in FIG. 1 for ease of illustration, it is to be understood that the data storage node 140 may comprise, or otherwise be a constituent component of, any type of data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The non-volatile storage media 142 may include one or more different types of persistent storage devices such as hard disk drives (HDDs), solid-state drives (SSDs), flash storage devices, or other types and combinations of non-volatile memory or next generation non-volatile memory (NGNVM). In one embodiment, the data storage node 140 is implemented using, for example, an enterprise-class storage platform comprising high performance, scalable storage arrays, which can be implemented for hyper-scale computing systems.

The queue-based GPU virtualization and management system 132 is configured to allow shared access and utilization of the GPU devices 134 of the GPU server node 130 by a plurality of client systems. The GPU devices 134 of the GPU server node 130 may comprise 2, 4, or 8 GPU devices, for example. In general, the queue-based GPU virtualization and management system 132 comprises a task queue service module that is configured to enqueue GPU processing tasks in a task queue. In addition, the queue-based GPU virtualization and management system 132 comprises a task scheduler/dispatcher module that is configured to schedule execution times for GPU processing tasks that are enqueued in the task queue, and to dispatch the GPU processing tasks enqueued in the task queue to a server backend GPU worker process to handle execution of the GPU processing tasks at their scheduled times using the GPU devices 134 of the GPU server node 130.

In this regard, the queue-based GPU virtualization and management system 132 of the GPU server node 130 allows different client systems to share the GPU devices 134 of the given GPU server node temporally and/or spatially. For example, in one embodiment, a single GPU device can be shared temporally by different client systems, wherein different GPU processing tasks associated with the different client systems are executed using the same GPU device at different times. In another embodiment, a single GPU device can be shared spatially, wherein different GPU processing tasks of different client systems are concurrently executed using the same GPU device, but executed in different sets of cores of the GPU device, for example.

More specifically, we define a first aspect of GPU utilization as temporal utilization. Assume that the client system 110 is allocated to a given GPU device on the GPU server node 130. If the client system 110 is not currently executing a GPU-accelerated application, or if the client system 110 is executing a GPU-accelerated application program, but the GPU-accelerated application program is not currently executing GPU-related code in the current application state, the given GPU device will be idling and not being utilized by the client system 110. In a conventional scheme, another client system that needs a GPU resource at the given moment would not be able to access the already allocated GPU device. However, the queue-based GPU virtualization and management system 132 of the GPU server node 130 allows two different client systems to have pending tasks in a task queue which are designated for execution using the same GPU device, but at different times.

A second aspect of GPU utilization is spatial utilization. In instances where a given GPU device is executing a compute kernel, but the compute kernel does not fully consume the resources of the GPU device, the queue-based GPU virtualization and management system 132 of the GPU server node 130 can coordinate the concurrent execution of multiple compute kernels (associated with different client systems) using the same GPU device to more efficiently utilize the internal resource of the given GPU device.

The GPU checkpointing system 136 is configured to provide GPU checkpointing services to the client system 110. When one or more of the GPU devices 134 are executing GPU processing tasks requested by the client system 110, the GPU checkpointing system 136 operates to generate checkpoint images (or snapshots) of in-memory data resident in the memory (e.g., RAM) of the GPU server node 130, wherein the checkpoint images are stored in the data storage node 140, or other persistent storage systems. With this checkpointing operation, a checkpoint image of the in-memory data associated of the GPU processing tasks of the client system 110 being executed by the GPU devices 134, which represents a current context of the GPU processing task(s) being executed by the one or more GPU devices 134 for the client system 100, will be generated and stored in the data storage node 140. In one embodiment of the invention, when the GPU checkpointing system 136 of the GPU server node 130 is performing a GPU checkpointing operation for the client system 110, the GPU server node 130 can concurrently execute a GPU processing task associated with a service request received from another client system using the one or more GPU devices 134 during the GPU checkpointing operation for the client system 110.

Figure 2:
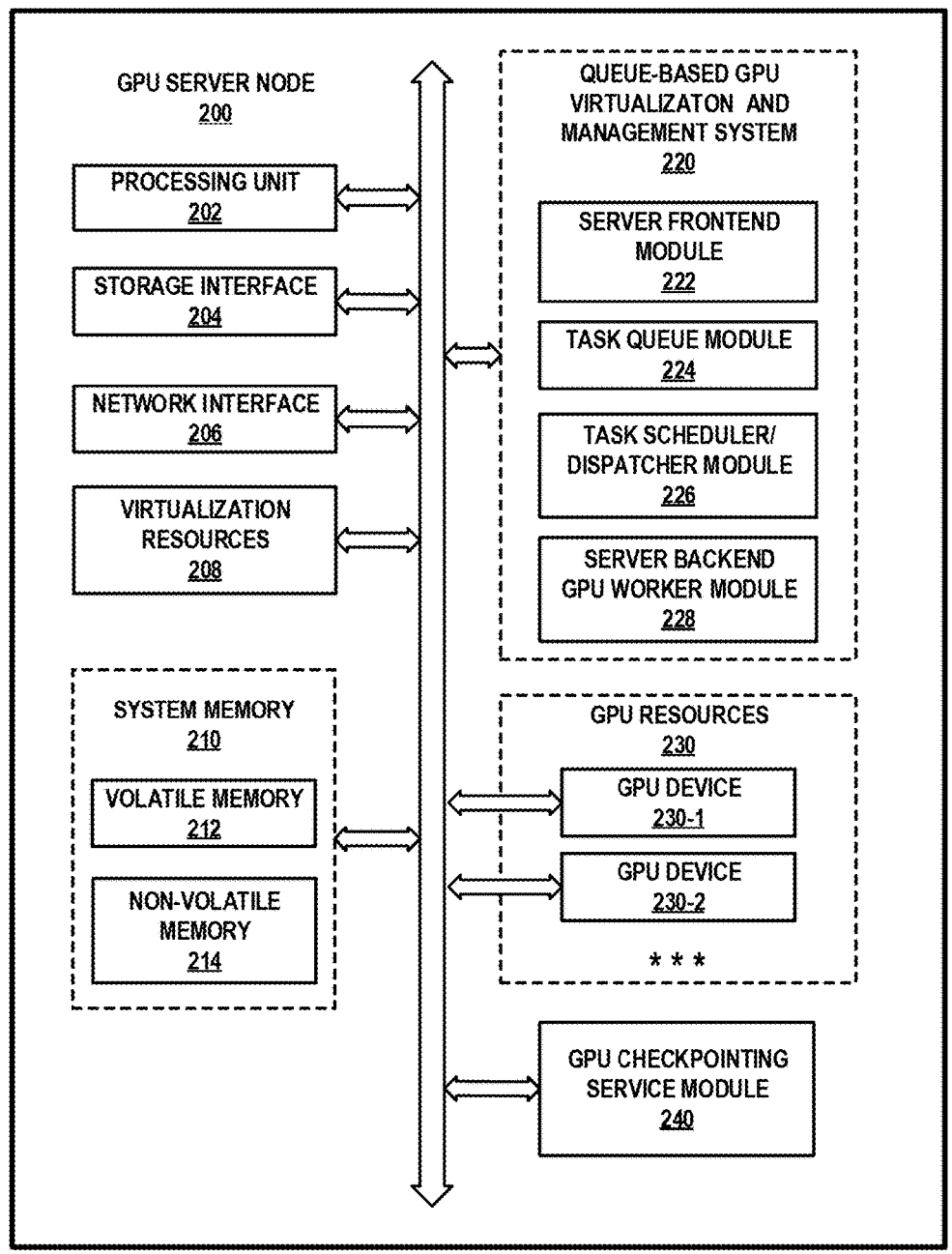
FIG. 2 schematically illustrates an embodiment of a GPU server node of the GPU service platform of FIG. 1, according to an embodiment of the invention.

FIG. 2 schematically illustrates an embodiment of a GPU server node of the GPU service platform of FIG. 1, according to an embodiment of the invention. The GPU server node 200 comprises a processing unit 202, storage interface circuitry 204, network interface circuitry 206, virtualization resources 208, system memory 210, a queue-based GPU virtualization and management system 220, GPU resources 230, and a GPU checkpointing service module 240. The system memory 210 comprises volatile memory 212 and non-volatile memory 214. The GPU resources 230 comprises at least two GPU devices 230-1 and 230-2. The queue-based GPU virtualization and management system 220 comprises a server frontend module 222, a task queue module 224, a task scheduler and dispatcher module 226, and a server backend GPU worker module 228.

In one embodiment, the various system modules 222, 224, 226, and 228 of the queue-based GPU virtualization and management system 220, and the GPU checkpointing service module 240 comprise software modules that are persistently stored in a storage device (e.g., non-volatile storage media 214). The system modules 222, 224, 226, 228, and 240 are loaded into the system memory resources (e.g., volatile memory 212 and/or non-volatile memory 214), and executed by the processing unit 202 to perform various functions as described herein. In this regard, the system memory 210 resources and the non-volatile storage media 214, and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processing unit 202 may comprise one or more processors that are configured to process program instructions and data to execute a native operating system (OS) and applications that run on the GPU server node 200. For example, the processing unit 202 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 204 enables the processing unit 202 to interface and communicate with the system memory 210, a data storage node (e.g., data storage node 140, FIG. 1), and other local storage and off-infrastructure storage media on the GPU server node 200 or on the data storage node, using one or more standard communication and/or storage control protocols to read data from, or write data to, volatile and non-volatile memory/storage devices. The network interface circuitry 206 enables the GPU server node 200 to interface and communicate with a network and other system components. The network interface circuitry 206 may comprise conventional transceivers of a type well known in the art (e.g., network interface cards, I/O adaptors, etc.).

The virtualization resources 208 can be instantiated to execute one or more applications or functions which are hosted by the GPU server node 200. For example, in one embodiment, the virtualization resources 208 comprise virtual machines that are implemented using a hypervisor platform which executes on the GPU server node 200, wherein one or more virtual machines can be instantiated to execute functions of the GPU server node 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the GPU server node 200, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the GPU server node 200. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 210 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 202 to execute a native operating system and one or more applications hosted by the GPU server node 200, and to temporarily store data that is utilized and/or generated by the native OS and application programs running on the GPU server node 200. For example, the volatile memory 212 of the system memory 210 may be a dynamic random-access memory (e.g., DRAM) or other forms of volatile RAM. The non-volatile memory 214 may comprise a storage-class memory (SCM) that is accessible as a memory resource. For example, the non-volatile memory 214 may be a NAND Flash storage device, a SSD storage device, or other types of next generation non-volatile memory (NGNVM) devices.

As noted above, the queue-based GPU virtualization and management system 220 is configured to allow multiple users/client systems to share the GPU devices 230-1 and 230-2 of the GPU server node 200, wherein the sharing is implemented temporally and/or spatially. In addition, the queue-based GPU virtualization and management system 220 is configured to logically bind with the queue-based GPU virtualization and management systems of other GPU server nodes to create a single logical queue-based GPU virtualization and management system which is controlled by a master GPU server node to manage access to a logical pool of GPU devices and resources across the multiple GPU server nodes that are allocated and logically bound for executing GPU processing tasks requested by a given client system.

In general, the server frontend module 222 implements functions to receive and process incoming requests, control messages, program code, etc., received from the GPU service platform 120 (FIG. 1) and from the GPU API 114 of the client system 110 (FIG. 1). The server frontend module 222 implements standard interfaces and functions to enable client/server communication between the client system 110 and the GPU server system 200. In addition, the server frontend module 222 comprises methods to pass incoming service requests for GPU services from the client system 110 to the task queue module 224.

The task queue module 224 comprises functions for implementing and managing a task queue, generating tasks (e.g., execution units) based on service requests received from client systems, and enqueuing the tasks on the task queue. The different tasks that are enqueued in the task queue correspond to different blocks of GPU program code of GPU-accelerated applications executing on the client system 110, which are sent to the GPU server node 200 for remote processing using the GPU resources 230. The task scheduler and dispatcher module 226 implements functions for assigning GPU devices to client systems, scheduling execution times for tasks that are placed on the task queue, and dispatching tasks to server backend GPU workers, which are implemented by the server backend GPU worker module 228, to handle execution of the tasks at the scheduled times using the assigned GPU devices. The server backend GPU worker module 228 implements functions to return GPU processing results of tasks to the requesting client system. The various modules 222, 224, 226, and 228 of the queue-based GPU virtualization and management system 220 collectively operate to provide fine-grained sharing of the GPU resources 230 among multiple client systems, both temporally and spatially, using various techniques as discussed herein.

The GPU checkpointing service module 240 is configured to provide GPU checkpointing services for client systems using one or more checkpointing methods according to embodiments of the invention, which will be discussed in further detail below with reference to FIGS. 3, 4, 5 and 6. In one embodiment, the GPU checkpointing service module 240 implements a conversation-based checkpointing method which is utilized for client GPU-accelerated application programs that are not configured to issue explicit checkpointing commands. An exemplary conversation-based checkpointing method according to an embodiment of the invention will now be discussed in further detail with reference to FIG. 3.

Figure 3:
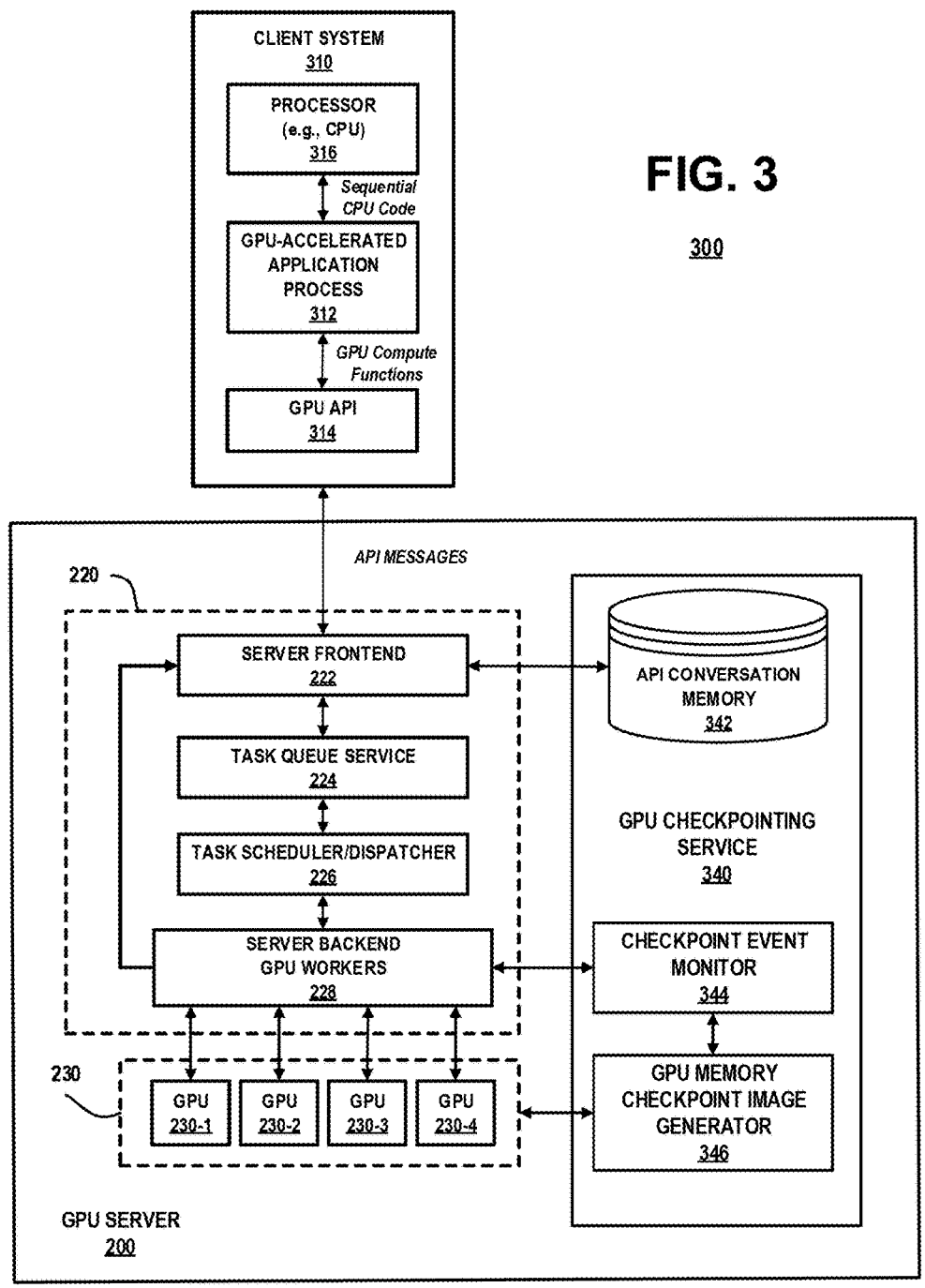
FIG. 3 schematically illustrates a run-time implementation of a GPU service platform which is configured to provide a conversation-based GPU checkpointing service, according to an embodiment of the invention.

FIG. 3 schematically illustrates a run-time implementation of a GPU service platform which is configured to provide a conversation-based GPU checkpointing service, according to an embodiment of the invention. For purposes of illustration, FIG. 3 depicts a run-time implementation of a GPU service platform 300 having a GPU server node 200 that is based on the server node framework shown in FIG. 2. Referring to FIG. 3, a client system 310 hosts and executes a GPU-accelerated application process 312. The client system 310 comprises a processor 316 (e.g., a CPU) which receives and executes sequential CPU code portions of the GPU-accelerated application process 312. The GPU-accelerated application process 312 passes GPU-related code (e.g., GPU compute functions, kernels, etc.) to a run-time implementation of a GPU API 314. The run-time implementation of the GPU API 314 comprises routines that are configured for local processing of certain GPU code, e.g., manipulating data, error handling, etc. In addition, the run-time implementation of the GPU API 314 is configured to transmit a GPU service request to the GPU server node 200 to request GPU processing services for executing compute-intensive code portions of the GPU-accelerated application process 312 which are encountered during execution of the GPU-accelerated application process 312 on the client system 310.

FIG. 3 further illustrates a run-time implementation of the queue-based GPU virtualization and management system 220 of FIG. 2, which comprises a server frontend 222, a task queue service 224, a task scheduler/dispatcher 226, and server backend GPU workers 228. The server frontend 222 and task queue service 224 represent running instances of the server frontend module 222 and the task queue module 224, respectively, shown in FIG. 2. In addition, the task scheduler/dispatcher 226 and the server backend GPU workers 228 represent running instances of the task scheduler/dispatcher module 226 and the server backend GPU worker module 228, respectively, shown in FIG. 2. FIG. 3 further illustrates a run-time implementation of a GPU checkpointing service 340, which comprises an API conversation memory 342, a checkpoint event monitor 344, and a GPU memory checkpoint image generator 346. The GPU checkpointing service 340 is configured to operate in conjunction with the queue-based GPU virtualization and management system 220 to provide a conversation-based checkpointing service. The GPU checkpointing service 340 is configured to provide GPU checkpointing services to the client system 310 without having to modify the GPU application code running on the client system 310.

During run-time, the server frontend 222 implements methods to handle requests that are received from the GPU API 314 of the client system 310. For example, the server frontend 222 comprises methods to process client credentials, perform authentication, and perform other types of functions to authenticate a user of the client system 310 and establish a communications session with the client system 310. For GPU service requests which require the processing of GPU code (e.g., compute kernels) passed from the GPU API 314, the server frontend 222 passes the service requests to the task queue service 224. In addition, server frontend 222 stores all API messages that are transmitted between the server frontend 222 and the GPU API 314, wherein the API messages are utilized in a subsequent "replay mode" to allow the client system 110 to recover checkpointed images, as will be discussed in further detail below.

The task queue service 224 processes the incoming GPU service requests by inserting one or more tasks associated with the incoming GPU service requests into a task queue, wherein the queued tasks can be asynchronously pushed to one or more server backend GPU workers 228 for execution at a scheduled time. The runtime task scheduler/dispatcher 226 implements methods for scheduling tasks, which are enqueued in the task queue, for execution by one or more server backend GPU workers 228 using one or more of the GPU devices 230-1, 230-2, 230-3, and 230-4, which are assigned to handle the tasks. The task scheduler/dispatcher 226 monitors the task queue and utilizes one or more scheduling protocols to determine which tasks should be consumed by the server backend GPU workers 228 at certain times. In one embodiment, the runtime task scheduler/dispatcher 226 utilizes scheduling protocols that take into consideration one or more factors such as task priority, memory location, GPU availability, fairness among all client systems, etc. In one embodiment, the task scheduler/dispatcher 226 comprises a pluggable software component which allows administrators of the GPU server node 200 to select a scheduling protocol which meets their needs and, thereby enabling the input of administrative constraints to govern user consumption and job execution using the GPU resources 230 of the GPU server node 200.

In addition, the runtime task scheduler/dispatcher 226 implements methods to dispatch or otherwise distribute tasks within the task queue among the server backend GPU workers 228 according to the determined schedules for task execution. In one embodiment, the runtime task scheduler/dispatcher 226 pushes queued tasks to the server backend GPU workers 228. The server backend GPU workers 228 execute the dispatched tasks using one or more GPU devices 230-1, 230-2, 230-3, and 230-4, which are assigned/designated by the runtime task scheduler/dispatcher 226 for executing the dispatched tasks at the scheduled times. In this regard, the task queue service 224, which stores and manages tasks that correspond to GPU service requests from multiple client systems, enables fine-grained sharing of GPU resources among the multiple client systems.

In particular, in one embodiment of the invention, the task queue service 224 enables temporal sharing of the GPU resources by multiple client systems. For example, as noted above, two different client systems can have pending tasks in the task queue which are designated for execution using the same GPU device, but at different times. In this regard, once a first client system is idling (e.g., the user is not executing the GPU-accelerated application, or the GPU-accelerated application is not utilizing the GPU device at a given time), the GPU device can be utilized by a second client system.

Furthermore, in another embodiment of the invention, the task queue service 224 enables spatial sharing of the GPU resources by multiple client systems. For example, spatial sharing of a given GPU by two different client systems allows pending tasks of the different client systems to be concurrently executed using the same GPU device, but using different portions (e.g., different sets of cores) of the GPU device. Therefore, a given GPU device is designated to a first client system, and the first client system cannot fully utilize the given GPU device, then a second client device can utilize another portion of the given GPU device at the same time.

In one embodiment of the invention, the client system 310 and GPU server node 200 communicate to perform GPU processing tasks requested by the client system 310. For example, a user will launch a GPU-accelerated application on the client system 310. While the GPU-accelerated application process 312 is executing on the client system 310, a determination is continually made as to whether a current block of program code to be executed comprises GPU-related code. If the current block of program code is not GPU-related code, the GPU-accelerated application process 312 passes the block of program code to the local processor 316 (e.g., CPU) to execute the current block of program code.

On the other hand, if the current block of program code is GPU-related code, the GPU-accelerated application process 312 passes the GPU-related code to the GPU API 314. The GPU API 314 determines whether the GPU code can be handled locally by the GPU API 314. For example, for static requests (e.g., error checking) that do not need GPU resources 230 of the GPU server node 200, the GPU API 314 can locally process such request and return results to the GPU-accelerated application process 312, thereby reducing communication overhead. In this regard, if it is determined that the GPU API 314 can locally process the current block of GPU-related code, the GPU API 314 will process the current block of GPU-related code and then return the processing results to the GPU-accelerated application process. On the other hand, if it is determined that the GPU API 314 cannot locally process the current block of GPU-related code, the GPU API 314 will generate and transmit a GPU service request to the GPU service platform.

In particular, in one embodiment of the invention, the GPU API 314 will transmit the GPU service request to the GPU server node 200, along with the block of GPU code to be executed by the GPU server node 200, as well as any associated data that is locally stored or otherwise accessed by the client system 310. The GPU service request comprises a request by the GPU API 314 to execute the GPU code and process the associated data using GPU resources 230 of the GPU server node 200. The GPU service request will include relevant information such as, e.g., an identifier of the client system 310 and/or GPU-accelerated application requesting the GPU service, priority level information, quality of service (QoS) information, metadata associated with the GPU code and/or data that is transmitted to the GPU server node 200, and other types of information that may be utilized by the queue-based GPU virtualization and management system 220 to implement the GPU service.

Next, on the GPU server-side, the server frontend 222 receives the GPU service request, along with the GPU code and associated data transmitted from the client system 310. The server frontend 222 tags the GPU service request with a timestamp which indicates a time that the GPU service request was submitted to the GPU server node 200. The server frontend 222 sends the GPU service request, the GPU code, and associated data to the task queue service 224, which invokes the task queue service 224 to generate one or more tasks based on the GPU code and associated data, and insert the one or more tasks into the task queue.

The task scheduler/dispatcher 226 monitors the task queue and determines when new tasks have been inserted into the task queue. The task scheduler/dispatcher 226 schedules the new tasks that have been placed into the task queue by scheduling a time for executing the new tasks and designating one or more GPU devices for processing the GPU code associated with the new tasks. When a new task is placed into the task queue, the task scheduler/dispatcher 226 may dynamically adjust the schedules for executing other tasks depending on the scheduling protocol implemented, e.g., to accommodate for priority levels of tasks or dedicated start times of tasks that must be commenced at user-requested start times, etc.

The efficiency of a parallel processing computing system depends on how tightly packed pending tasks can be scheduled so as to maximize system utilization while minimizing wait times. The manner in which tasks are scheduled will depend on the scheduling protocol or queuing model that is implemented by the task scheduler/dispatcher 226. The type of scheduling protocol or queuing model that is implemented will vary depending on the parallel processing environment that is supported by the GPU servers. For example, there may be instances in which the GPU servers provide support for (i) GPU-accelerated applications that are not time or deadline critical and/or (ii) GPU-accelerated applications that require rigid and fixed time slots to execute tasks for real-time applications. In this regard, the task scheduler/dispatcher 226 should be capable of efficiently scheduling homogenous and/or heterogeneous workloads using suitable scheduling protocols that maximize system utilization while minimizing job wait times.

When the scheduled time for a given task execution arrives, the task scheduler/dispatcher 226 will dispatch the given task to the server backend GPU workers 228 to handle execution of the dispatched task using one or more designated GPU devices within the pool of GPU devices 230-1, 230-2, 230-3 and 230-4 according to the task schedule. With this process, different tasks in the task queue, which are associated with different GPU service requests from different client systems, can be executed utilizing the same designated GPU device, through temporal utilization or spatial utilization of the GPU device, as discussed above. The processing results, which are associated with the GPU service request, are then returned to the requesting GPU API 314 on the client system 310, and the GPU API 314 passes the processing results to the GPU-accelerated application process 312. In this regard, a GPU virtualization scheme is implemented in which the GPU-accelerated application process 312 is unaware of the background GPU processing that is performed on the GPU-related code portions of the GPU-accelerated application process 312. The GPU-accelerated application process 312 simply passes GPU-related code (and associated data) to the GPU API 314, and receives GPU processing results associated with GPU-related code from the GPU API 314.

The queue-based GPU virtualization techniques implemented by GPU servers according to embodiments of the invention optimize GPU utilization by allowing fine grained GPU sharing. Indeed, the queue-based GPU virtualization techniques discussed herein allow multiple client systems to concurrently use GPU resources as if the GPU resources are dedicated. The client systems send GPU service requests to a GPU server, and the GPU server stores the tasks associated GPU service requests in a task queue. The task scheduler/dispatcher schedules the times for executing the tasks in the task queue, utilizing the GPU resources in an efficient and fair way, which involves sharing the GPU resources where possible to further optimize GPU utilization.

In another embodiment of the invention, QoS control is enabled by monitoring pending tasks in the task queue. As noted above, the server frontend 222 tags each incoming GPU service request with a timestamp which indicates the time that the GPU service request was submitted to the GPU server. Since the task scheduler/dispatcher 226 knows the time that the GPU service requests are received, and the identity of the client systems associated with the received GPU service requests, the task scheduler/dispatcher 226 can guarantee fair utilization of the GPU resources by all requesting client systems. Moreover, if some tasks in the task queue are pending too long before starting, it can be determined that the GPU server is not capable of handling the workload at that time and some scaling action can be performed either by the administrator or by the server directly to, e.g., increase the amount of GPU resources allocated to the GPU server.

The GPU checkpointing service 340 operates in conjunction with the queue-based GPU virtualization and management system 220 as follows. When the client system 310 initiates communication with the GPU server node 200 to request GPU processing tasks, the GPU-accelerated application on the client system 310 is running in "normal mode." When the client system 310 logs into the GPU service platform and connects with the GPU server node 200, a checkpoint tag is generated and transferred from the server frontend 222 to the client system 310. The checkpoint tag is subsequently utilized to identify which record(s) to recover later in the event that the requested GPU processing tasks are prematurely interrupted/terminated for some reason (e.g., power failure, etc.). After the communication session is established, the server frontend 222 will record all API conversations (e.g., API messages) between the server frontend 222 and the GPU API 314 into the API conversation memory 342. In one embodiment, the API conversation memory 342 comprises a designated region in system memory (e.g., RAM) of the GPU server node 200 to temporarily store the API messages and conversation information to reduce communication with a secondary storage device (e.g., HDD) which resides in a data storage node coupled to the GPU server node 200.

The checkpoint event monitor 344 communicates with the server backend GPU workers 228 to determine when a "critical point" is reached in the execution of a GPU processing task for the client system 310. At a critical point of the execution (e.g., when copying GPU memory from the GPU server node 200 to the processor 316 (e.g., CPU) of the client system 310), the checkpoint event monitor 344 will send a control message to the GPU memory checkpoint image generator 346 commanding the GPU memory checkpoint image generator 346 to generate a checkpoint image of the current state of the GPU memory of the one or more GPU devices that are executing the GPU processing tasks for the client system 310. In addition, all API conversation data that is temporarily stored in the API conversation memory 342 will be copied to a predesignated region in non-volatile storage, and logically associated with the corresponding checkpoint images. Since only at the critical points of the execution will the client system 310 change its internal state related to the server-side GPU processing, it is safe to only take checkpoint images (or snapshots) of GPU memory at those points.

In one embodiment, the selection of "critical points" will depend on the policy of the GPU service platform, the GPU server node allocated to handle the GPU processing tasks of the client system 310, the workload of the client system 310, etc. For example, if the client system 310 frequently copies data from the GPU server node 200, the "data copy" API messages would be considered "critical points" in the execution of the GPU processing tasks for the client system 310. In another embodiment, if the client system 310 infrequently copies data from the GPU server node 200, the "critical points" of executed can be selected at a predetermined time interval. In this instance, the force taking of a GPU memory checkpoint images at the expiration of each predetermined time interval can reduce the information that can be lost, and hence can accelerate the recovery process. In yet another embodiment, the GPU checkpointing service 340 can schedule the checkpointing at moments when the GPU devices are not busy so that the checkpointing would not impact the performance of any other task.

When the circumstance arises where the client system 310 needs to recover the results of one or more GPU processing tasks executed GPU server-side, the client system will run the corresponding GPU-accelerated application in a "replay mode." The initiation of the "replay mode" does not require any change in program code of the GPU-accelerated applications. Instead, the GPU API 314 library can utilize an environment variable to determine if the program is running in a "replay mode" to recover GPU server-side processing results. In the replay mode, the client system 310 would log into the GPU server node 200, but when logging in with replay mode, the GPU checkpointing service 340 of the GPU server node 200 loads a copy of the stored API conversation in non-volatile storage into the system memory (e.g., RAM) of the GPU server node 200.

Then, for any incoming GPU processing request, rather than executing the GPU processing on the GPU resources 230, the incoming GPU processing request is routed to the GPU checkpointing service 340. The GPU checkpointing service 340 compares the incoming request with the API conversation messages, and returns a stored checkpoint image of the GPU processing result associated with the API message that corresponds to the incoming request. The replay mode process will continue until a received request from the GPU API 314 does not match any previous request in the API conversation history or no more API messages can be recovered. In this situation, the GPU API 314 library returns program execution to "normal mode" and subsequent requests from the client system 310 will be executed by one or more allocated GPU devices 230 on the GPU server node 200.

The following example illustrates an implementation of a conversation-based checkpointing method in the context of client system executing a machine learning task with a CUDA GPU library. Assume that a user of the client system 310 needs to execute a long running machine learning task on the GPU server 200. To execute the program, the client system 310 connects to the GPU server node 200, and the GPU server node 200 will automatically store the API conversation in the API conversation memory 342 during execution of the machine learning task. During the execution of the machine learning task, assume that the GPU server node 200 suffers from system failure for some reason (e.g., loss of power), or that the GPU server node 200 interrupts the execution of the machine learning task of the client system 310 to execute some higher priority task (e.g., task scheduler/dispatcher 226 preempts a currently executing task to perform a higher priority task).

In this circumstance, the user of the client system 310 would have to restart the machine learning task at some later time. Rather than commencing execution of the machine learning task from the beginning, an environment variable such as GPU_SERVICE_REPLAY can be added to program code, wherein the GPU API library detects the environment variable and determines that the execution of the task will be in "replay" mode. In this mode, the requests sent by the GPU API 314 to the GPU server node 200 will remain the same, except for setting a flag, try_replay=1. The GPU server node 200 receives the request and will load the stored API conversation into memory from a data storage node. For each incoming request with the flag try_replay, the GPU server node 200 will attempt to match the incoming request with a previous request that is contained in the API conversation history. If there is a match, the GPU server node 200 will directly reply with the previous checkpointed GPU processing results. Since most of the machine learning task was performed on one or more GPU devices, the previously executed portion of the machine learning task, prior to the break point, need not be executed again, thereby allowing the execution of the machine learning task of the client system 310 to reach the breakpoint much faster than simply re-executing the program from the beginning.

A conversation-based checkpointing service as discussed above is sufficient for GPU-accelerated applications that require a relatively small amount of client-side CPU processing. However, if a given GPU-accelerated application requires a relatively large amount of computations for both client-side CPU processing and server-side GPU processing, then a "replay mode" as discussed above can result in a relatively long recovery time due to having to repeat the client-side CPU processing/computations. To address this issue, another embodiment of the invention implements an explicit checkpointing mechanism to allow the host GPU-accelerated application program to specify when a checkpoint is necessary.

Figure 4:
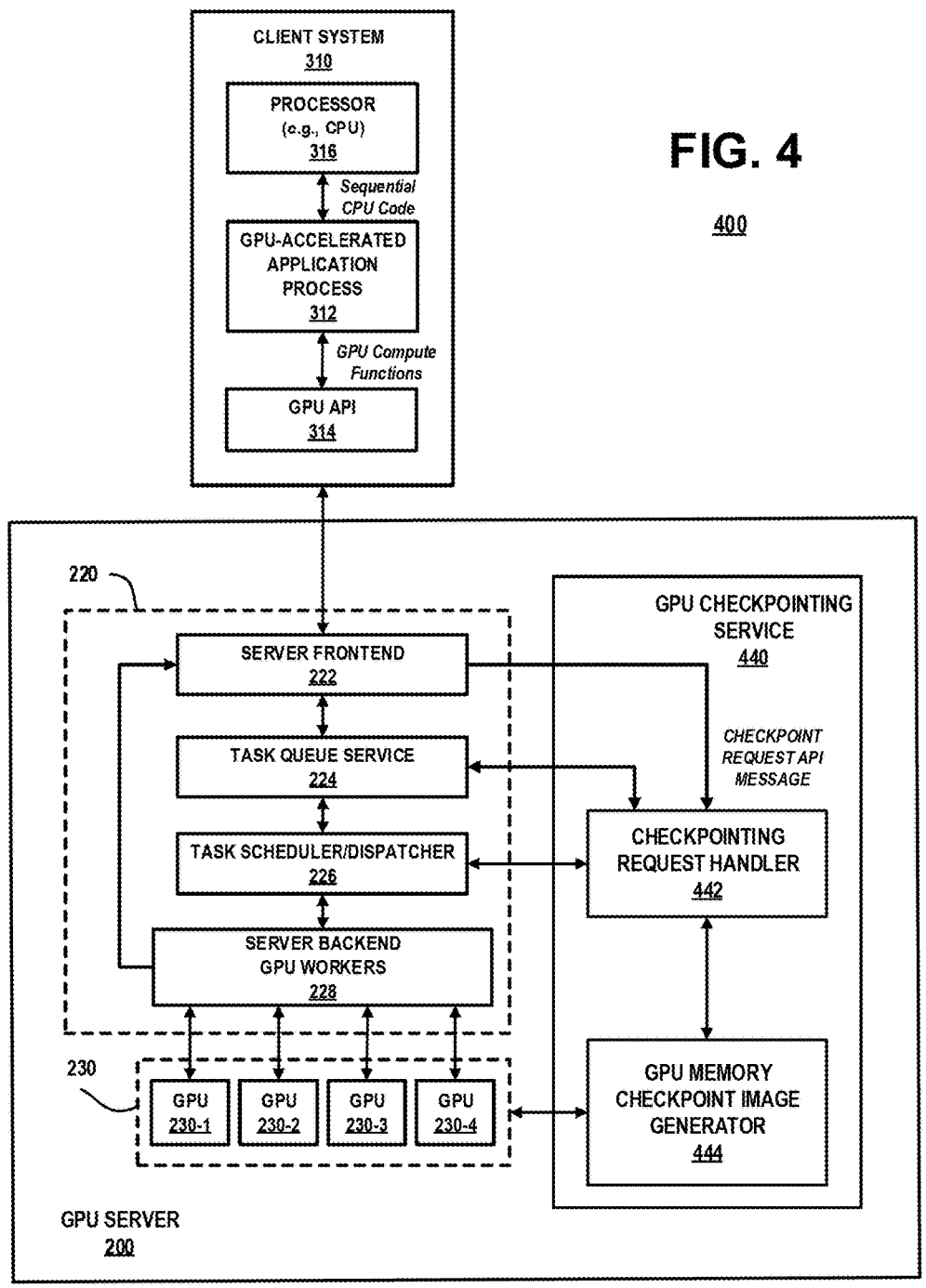
FIG. 4 schematically illustrates a run-time implementation of a GPU service platform which is configured to provide an explicit client-driven GPU checkpointing service according to another embodiment of the invention.

For example, FIG. 4 schematically illustrates a run-time implementation of a GPU service platform 400 which is configured to provide an explicit client-driven GPU checkpointing service to a client system, according to another embodiment of the invention. The GPU service platform 400 shown in FIG. 4 is similar to the GPU service platform shown in FIG. 3 except that the GPU server node 200 in FIG. 4 implements an explicit client-driven GPU checkpointing service 440, according to an embodiment of the invention. The GPU checkpointing service 440 comprises a checkpointing request handler 442 and a GPU memory checkpoint image generator 444.

On the client-side, the GPU API 314 of the client system 310 comprises an API library with a dedicated API to issue a GPU checkpointing request to GPU server node 200. In one embodiment, the GPU API 314 of the client system 310 will transmit a checkpointing request to the GPU server node 200 in a same format as other requests that are transferred between the GPU server node 200 and the client system 310. The checkpointing message will initiate the scheduling and execution of a GPU checkpoint operation by the GPU checkpointing service 440. In this embodiment, since the GPU API 314 only needs to send a checkpointing command via an API request, the API request can be asynchronous to the host GPU-accelerated application program. In other words, the client-side processor 316 (e.g., CPU) does not need to wait for the checkpointing process to complete before continuing the execution of other client-side CPU processing tasks.

On the server-side, the server frontend 222 receives the checkpoint request API message, and forwards the received message to the checkpointing request handler 442 of the GPU checkpointing service module 440. The checkpointing request handler 442 will communicate with the task queue service 224 and the task scheduler/dispatcher 226 so that the current checkpointing request is scheduled and added to a global request queue.

When the scheduled time arrives to perform a checkpointing operation for a queued checkpoint command, the task scheduler/dispatcher 226 will send a control message to the checkpointing request handler 442, and the checkpointing request handler 442 will send a control message to the GPU memory checkpoint image generator 444 commanding the GPU memory checkpoint image generator 444 to generate a checkpoint image of the current state of the GPU memory of the one or more GPU devices that are executing the GPU processing tasks for the client system 310.

Since the task scheduler/dispatcher 226 implements smart scheduling methods to schedule requests with minimal conflict, the current checkpointing task will be scheduled at an optimal time, which results in a minimal performance penalty due to execution of the checkpointing operations. In addition, the client system 310 can continue to dispatch GPU processing tasks to the GPU server node 200, since the GPU server node 200 is configured to manage the dependency relationship among all requests. The GPU server node 200 can guarantee that no other requests from the given client system 310 are executed on the GPU server node 200 during execution of the checkpointing operation.

The explicit client-driven GPU checkpointing service 440 guarantees optimal performance when performing checkpointing operations in a multi-client environment. When a checkpointing request is dispatched on the GPU server node 200, the GPU checkpointing service 440 operates in conjunction with the queue-based GPU virtualization and management system 220 to ensure that no other GPU processing task requested by the client system 310 is being executed on the GPU devices. On the other hand, all other pending or executing GPU processing tasks requested by other client systems may continue during the checkpointing operation for the client system 100. In other words, the checkpointing workload for the client system 110 can be overlapped with GPU processing of the workloads of other client systems.

Figure 5:
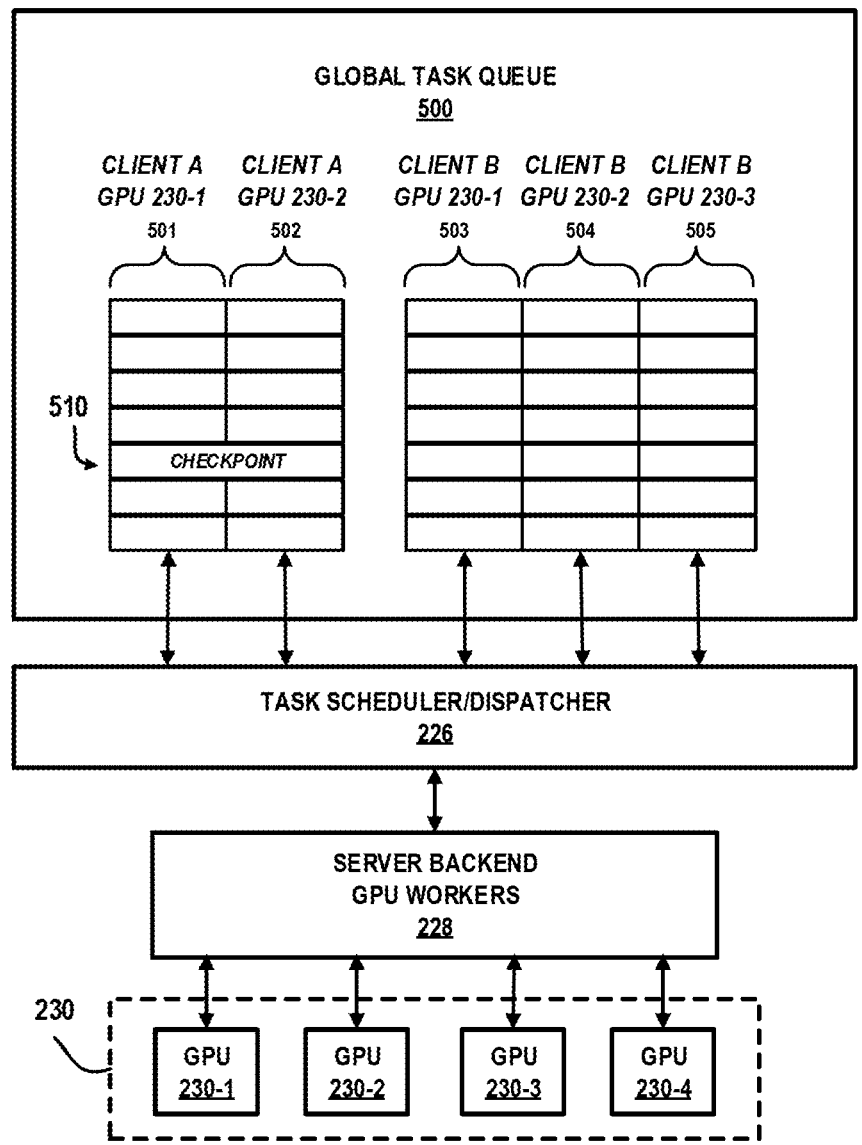
FIG. 5 schematically depicts an example state of a global task queue of a GPU server node in the GPU service platform of FIG. 4.

For example, FIG. 5 schematically depicts an example state of a global task queue 500 of the GPU server node 200 in the GPU service platform of FIG. 4, in response to an explicit checkpointing command issued by a client system in a multi-client environment. As schematically illustrated in FIG. 5, the global task queue 500 (which is managed by the task queue service 224) comprises a plurality of task queues 501, 502, 503, 504 and 505, which have pending GPU processing tasks requested by two client systems, Client A and Client B. In particular, FIG. 5 schematically illustrates that the task queues 501 and 502 include queued GPU processing tasks requested by Client A, wherein the queued GPU processing tasks in the task queue 501 are allocated to the GPU device 230-1, and wherein the queued GPU processing tasks in the task queue 502 are allocated to the GPU device 230-2. As further shown in FIG. 5, the task queues 503, 504, and 505 include queued GPU processing tasks requested by Client B, wherein the queued GPU processing tasks in the task queue 502 are allocated to the GPU device 230-1, wherein the queued GPU processing tasks in the task queue 504 are allocated to the GPU device 230-2, and wherein the queued GPU processing tasks in the task queue 505 are allocated to the GPU device 230-3.

The example embodiment of FIG. 5 further illustrates a checkpointing task 510 pending in the task queues 501 and 502 for Client A. The checkpointing task 510 is scheduled and inserted into the task queues 501 and 502 of the global task queue 500 in response to an explicit checkpointing request received by Client A. As shown in FIG. 5, the checkpointing task 510 is inserted into all task queues (e.g., 501 and 502) which have pending GPU processing task requested by Client A to ensure that the pending checkpoint task 510 will temporarily block the execution of the pending GPU processing tasks requested by Client A, which are allocated for execution by GPU devices 230-1 and 230-2, during the GPU checkpointing operation.

In the example embodiment of FIG. 4, a user can add checkpointing instructions into a GPU-accelerated application so that when the program code is executed, the current state of GPU kernel executing on the GPU server node 200 can be stored periodically. In this example, the GPU API library 314 will periodically send an explicit checkpointing request to the GPU server node 200 according to the checkpointing programming instructions included in the GPU-accelerated program. As noted above, client-side processing does not need to wait for a checkpointing result to be completed server-side for a given task iteration, but can proceed to execute a next iteration. The checkpointing API generates a tag which can be used by the client system 310 to request an associated checkpointing result from the GPU server node 200, which was previously generated and stored in a backend data storage system by the GPU server node 200. In particular, the client system 310 will can store multiple "checkpointing" tags that are generated during the execution of a GPU processing task of the client system 310. When the client system 310 needs to recover some or all of a GPU state associated with a previously executed GPU processing task, the client system 310 can utilize the last received tag to make the GPU server node 200 return to a previous breakpoint in the execution.

Another embodiment of the invention provides a GPU checkpointing service that can be implemented in a cloud computing environment in which a GPU service platform comprises a cluster of GPU server nodes to support GPU processing and checkpointing services for multiple client systems. In this cloud computing environment, the GPU processing tasks requested by a given client system may be executed using multiple GPU devices across two or more GPU server nodes within the GPU server cluster, which are dynamically allocated by the GPU service platform to handle the GPU processing tasks requested by the given client. In this circumstance, the current state of the GPU-accelerated application may reside in different memory devices (e.g., RAMs) across different GPU server nodes, in which case the complete checkpoint image of the current GPU program state is a composite of all in-memory images that reside in different memory devices of the different GPU server nodes that are allocated to handle the associated GPU processing task. To implement GPU checkpointing in this cloud computing environment, the checkpointing service should be configured to ensure that the GPU memory image to be checkpointed is generated at one time when all the different portions of the image are available. In addition, the GPU checkpointing service should implement a synchronization mechanism to synchronize the checkpoint image generation process among all GPU sever nodes within the GPU service platform, which are allocated to handle a GPU processing task of the client system, while minimizing the network latency associated with the synchronized checkpoint image generation process.

In one embodiment, a GPU checkpointing service for a multi-service environment comprises a multi-layer queueing system (e.g., 2-layer) wherein all the services (e.g., GPU services provided by GPU server nodes) are managed by a single service interface that is exposed to a client system. In this embodiment, the service interface is configured to make it appear to the client system that the GPU processing and checkpointing tasks are being handled by a single GPU server node, while the service interface controls and manages the GPU processing and checkpointing operations across a pool of allocated GPU server nodes and resources for the client system. The client system will connect to the GPU service platform and a service interface is instantiated for the client system, which maps the client system to one or more GPU server nodes to provide GPU processing and checkpointing services to the client system. In an alternate embodiment, the service interface can be implemented client-side, depending on the application.

FIG. 6 is a high-level schematic illustration of a computing system 600 which implements a GPU service platform that is configured to provide GPU processing and checkpoint services to multiple client systems over a cluster of GPU server nodes, according to another embodiment of the invention. The computing system 600 comprises a client system 110, a communications network 115, and a GPU service platform 610. The client system 110 and communications network 115 are similar to those elements discussed above in FIG. 1, so a detailed description will not be repeated. The GPU service platform 610 comprises a GPU service controller 620 (e.g., control server), a server cluster 630 (e.g., server farm) comprising a plurality of GPU server nodes 130-1 and 130-2, a service platform network 640, and a data storage system comprising a plurality of data storage nodes 140-1 and 140-2. The GPU service controller 620 comprises a GPU server allocation and scheduling module 622, a request queue 624, and a checkpoint controller 626. The GPU server nodes 130-1 and 130-2 are the same or similar to the GPU server node 130 of FIG. 1, and the data storage nodes 140-1 and 140-2 are the same or similar to the data storage node 140 of FIG. 1, so a detailed description of such components will not be repeated. While only two GPU server nodes 130-1 and 130-2 are shown in FIG. 6 for ease of illustration, the server cluster 630 may comprise more than two GPU server nodes.

The service platform network 640 is configured to enable network communication between the GPU service controller 620 and the GPU server nodes 130-1 and 130-2 within the server cluster 630. In addition, the service platform network 640 is configured to enable peer-to-peer network communication between the GPU server nodes 130-1 and 130-2 within the server cluster 630. Depending on the network distribution and geographic location of the constituent components and nodes of the GPU service platform 610, the service platform network 640 may comprise, for example, a LAN, a WAN, or a combination of one or more LANs and WANs, as well as other types of communications networks that are commonly used to implement cloud computing platforms.

The GPU service controller 620 is configured to control various functionalities of the GPU service platform 610. For example, the GPU service controller 620 is configured to receive a service request from the client system 110 for GPU processing services provided by the GPU service platform 610, and then invoke the GPU server allocation and scheduling module 622 to allocate and schedule one or more of the GPU server nodes 130-1 and 130-2 within the GPU server cluster 630 to handle execution of GPU processing tasks associated with the received service request. The GPU server allocation and scheduling module 622 will allocate either a single GPU server node or multiple GPU server nodes within the cluster of GPU server nodes 630 to handle the service request depending on, e.g., the available GPU devices and processing resources of the GPU server nodes, the nature of the GPU processing tasks associated with the service request, etc.

For example, in one embodiment, the allocation and scheduling of GPU server nodes is determined based, at least in part on, information contained in a database of policies and a database of GPU server registration information maintained by the GPU service controller 620. Each GPU server node 130-1 and 130-2 within the GPU server cluster 630 registers with the GPU service controller 620, wherein the GPU server node registration information is maintained in a GPU server registration information database. For example, when a given GPU server node is booted, the GPU server node will acquire information regarding all available GPU devices and resources on the given GPU server node. The GPU server node will then register itself and all available GPU devices and resources with the GPU service controller 620, and provide various types of registration information that enables connection to the GPU server node and utilization of the available GPU devices and resources on the given GPU server node.

Furthermore, in one embodiment of the invention, the administrator of the GPU service platform 610 maintains policies with regard to GPU server node allocation. For example, the policies may specify whether to execute GPU processing tasks on local GPU server nodes, on remotely located GPU server nodes, or on a combination of local and remotely located GPU server nodes within the server cluster 630. The administrator will specify one or more policies for each client system and/or each type of GPU application that can be serviced by the GPU service platform 610, so that when a connection is made with the client system 110 for a GPU service request, the GPU server allocation and scheduling module 622 can map and bind the GPU service request to one or more local, cloud based or hybrid collection of GPU server nodes to service the client request, or otherwise determine a proper GPU server node allocation for the given client service request. In all instances, the handling of the GPU service requests from a client system appears to be performed by a single GPU server node, while the workload may migrate transparently between GPU resources of a set of distributed GPU server nodes based on one or more specified policies of the data center administrator.

Furthermore, the allocation and scheduling of GPU server nodes is dynamically determined based on information contained in the service request received from the client system 110. For instance, the client request may specify a number of GPU devices for handling the GPU processing tasks associated with the GPU service request, wherein the allocation of one or more GPU server nodes within the server cluster 630 is determined so that the allocated GPU server nodes comprise a total number of available GPU devices that meet the specified number of GPU devices as requested in the service request. In addition, the client request may specify one or more service attributes associated with the GPU processing tasks associated with the service request. For example, the service attributes can specify a QoS and a priority level for executing the GPU processing tasks, wherein the allocation of one or more GPU server nodes within the server cluster 630 is dynamically determined so that the allocated GPU server nodes will collectively have sufficient processing resources to satisfy the service attributes specified in the GPU service request.

When the client system 110 requires the services of the GPU service platform 610 to execute GPU program code, the GPU API 114 connects to the GPU service platform 610 and transmits a service request to the GPU service controller 620 for GPU server allocation. The GPU service controller 620 invokes the GPU server allocation and scheduling module 622 to dynamically allocate and schedule one or more of the GPU server nodes 130-1 and 130-2 within the GPU server cluster 630 to handle execution of GPU processing tasks associated with the received service request. Then, based on (i) the GPU server node registration information, (ii) one or more predefined policies associated with the client system 110, and/or (iii) information contained in the GPU service request received from the client system 110, the GPU server allocation and scheduling module 622 will have knowledge of all available GPU devices and resources within the GPU server cluster 630, knowledge of all currently mapped client-to-GPU server node connections, as well as knowledge of the required GPU processing resources based on the client service request. Using this knowledge, the GPU server allocation and scheduling module 622 will survey all available (registered) GPU server nodes, resources and currently connected jobs, and then allocate one or more registered GPU server nodes within the server cluster 630 to handle the service request. In doing so, the GPU server allocation and scheduling module 622 can allocate a single GPU server node to handle a small GPU processing task, or logically bind multiple GPU server nodes to handle larger GPU processing tasks. In this regard, the GPU service controller 620 implements methods for, e.g., scheduling GPU device and computing resources across multiple GPU server nodes within the server cluster 630, mapping client systems to GPU server nodes within the server cluster 630 based on jobs attributes and available GPU resources, and other functionalities as discussed herein.

For example, the GPU server allocation and scheduling module 622 can allocate a single GPU server node within the server cluster 630 if the single GPU server node has an amount of available GPU devices and resources which is deemed sufficient to handle execution of the GPU processing tasks associated with the service request. When the GPU processing tasks of the service request cannot be handled using the GPU devices and resources of a single GPU server node within the server cluster 630, the GPU server allocation and scheduling module 622 will select two or more GPU server nodes within the server cluster 630 which collectively have an amount of available GPU devices and resources which is sufficient to handle execution of the GPU processing tasks associated with the service request.

For a multiple GPU sever node allocation, the GPU server allocation and scheduling module 622 will communicate with each of the allocated GPU server nodes, commanding the allocated GPU server nodes to logically bind together and establish communication links to conduct peer-to-peer communications and workload processing to execute the GPU processing tasks associated with the client request. The GPU server allocation and scheduling module 622 will select one of the allocated GPU server nodes to be a master node, and designate the other allocated GPU server nodes as slave nodes. The GPU service controller 620 would then return information regarding the master GPU server node to the client system 110 to enable the client system 110 to connect to the master GPU server node and commence execution of the requested GPU processing tasks.

In particular, in one embodiment of the invention, when two or more GPU server nodes within the server cluster 630 are allocated and logically bound to handle the execution of GPU processing tasks requested by a client system, the queue-based GPU virtualization and management systems 132 of the allocated GPU server nodes are logically bound to establish a single logical queue-based GPU virtualization and management system comprising a single logical task queue, a single logical task queue service module, and a single logical task scheduler/dispatcher module, for example, to collectively handle the GPU processing tasks requested by the client system. The single logical queue-based GPU virtualization and management system that is established by the logical binding of the GPU server nodes is managed by the master GPU server node to control queueing and dispatching of the GPU processing tasks associated with the service request of the client system. When executing the GPU processing tasks, the master GPU server node will coordinate access to all GPU devices and resources accessed across the allocated (logically bound) master and slave GPU server nodes, returning processing results to the client system 110 only through the master GPU server node. In this case, the client system 110 sees a larger logical GPU server node, while the master GPU server node coordinates and manages the execution of the GPU processing tasks across the allocated (and logically bound) GPU server nodes with fine grain control, transparently to the client system 110.

The logical binding of multiple GPU server nodes presents a single logical GPU server node which logically combines the GPU devices and resources of the logically bound GPU server nodes to create a pool of GPU devices and resources that are mapped to the client system for consumption. In this configuration, the single logical GPU server node collectively utilizes the pool of GPU devices and resources across the logically bound GPU server nodes to execute the GPU processing tasks associated with the service request of the client system as if the pool of GPU devices and resources resided in a single GPU server node dedicated to the client system for handling the service request. In this model, the GPU service platform can provide GPU processing services to client systems using GPU devices and resources that are local to the GPU service platform (e.g., data center), or GPU devices and resources that are remotely located in another data center or cloud computing platform, or a combination of local and remotely located GPU devices and resources.

Furthermore, with regard to GPU checkpointing operations, the GPU service controller 620 utilizes the request queue 624 and checkpoint controller 626 to synchronize checkpointing operations for a given client system across one or more GPU server nodes within the server cluster 630. In the computing system of FIG. 6, the GPU checkpointing service 136 of the GPU server nodes 130-1 and 130-2 can implement one or more of the checkpointing methods discussed herein, e.g., conversation-based or explicit client-driven checkpointing methods. For example, in one embodiment of the invention, in the context of an explicit client-driven GPU checkpointing service, the GPU service platform 610 operates as follows.

During run-time operation, when the GPU API 114 of the client system 110 transmits a checkpointing request to the GPU service platform 610, the GPU service controller 620 forwards the checkpoint request to the checkpoint controller 626 for handling. The checkpoint controller 626 will send a checkpoint control message either to the single GPU server node (for single node allocation) or to the master GPU server node (for multiple node allocation) in the server cluster 630, which is currently handling GPU processing tasks for the given client system 110.

In response to the checkpoint control message, for a single GPU server node allocation, the GPU checkpointing service 136 of the single allocated GPU server node in the server cluster 630 will operate in conjunction with the associated queue-based GPU virtualization and management system 132 on that GPU server node to enqueue and schedule the checkpoint request for execution, using methods as discussed above with reference to FIGS. 4 and 5. If additional GPU service requests are received by the GPU service controller 620 from the client system 110, these additional GPU service requests will be temporarily stored in the request queue 624 for the client system 110 until the checkpointing operation associated with the currently queued and scheduled checkpoint request has been completed. When the allocated GPU server node has completed the checkpointing operation, the GPU server node will send a notification message to the checkpoint controller 626. In response, the checkpoint controller 626 will send a control message to the GPU server allocation and scheduling module 622 which indicates that the current checkpointing operation for the client system 110 is completed, and the GPU server allocation and scheduling module 622 will proceed to allocate and schedule any pending service requests of the client system 110 which were temporarily stored in the request queue 624 during the checkpointing operation.

For a multiple GPU server node allocation, in response to the checkpoint control message received from the checkpoint controller 626, the master GPU server node will forward the checkpointing request to each of the slave GPU server nodes, which are allocated to collectively handle the current GPU processing task of the client system 110. In response to the checkpoint control message, the GPU checkpointing service 136 in each of the master and slave GPU server nodes will operate in conjunction with the respective queue-based GPU virtualization and management systems 132 in the master and slave GPU server nodes to enqueue and schedule the checkpoint request of the client system for execution, using methods as discussed above with reference to FIGS. 4 and 5. In this circumstance, the local checkpointing operations that are locally performed in each of the master and slave GPU server nodes can be performed at different times so that each GPU server node can determine and perform the local checkpointing operation for the current GPU processing task of the client system 110 at an optimal time, depending on the current workload of the GPU server node (e.g., processing tasks of other client systems).

If additional GPU service requests are received by the GPU service controller 620 from the client system 110, the additional GPU service requests will be temporarily stored in the request queue 624 for the client system 110 until the checkpointing operation associated with the currently queued and scheduled checkpoint request has been completed. As each slave GPU server node has completed the local checkpointing operation for the current GPU processing task of the client system 110, the slave GPU server node will notify the master GPU server node that the local checkpointing operation on the server node is complete. When the master GPU server node has completed its local checkpointing operation for the current GPU processing task of the client system 110, and has received notification from all other slave GPU server nodes that the local checkpointing operations on those slave nodes have been completed for the current GPU processing task, the local checkpointing results from each of the master and slave GPU server nodes will be physically or logically combined to generate a complete checkpoint image which corresponds to the current checkpointing request, and then the complete checkpoint image will be stored in one or more of the data storage nodes 140-1 and 140-2.

The master GPU server node will send a notification message to the checkpoint controller 626 that the checkpointing operation is complete. In response, the checkpoint controller 626 will send a control message to the GPU server allocation and scheduling module 622 which indicates that the current checkpointing operation for the client system 110 is completed, and the GPU server allocation and scheduling module 622 will proceed to allocate and schedule any pending service requests of the client system 110 that are currently in the request queue 624.

Furthermore, in an alternative embodiment in which the GPU checkpointing service 136 of the GPU server nodes within the cluster 630 implement a conversation-based GPU checkpointing service as discussed above with reference to FIG. 2, the GPU service platform 610 operates as follows. For example, for a multiple GPU server node allocation, when master GPU server node determines that the GPU checkpointing service 136 executing on any of the allocated master or slave GPU server nodes has detected that a "critical point" has been reached in the execution of a current GPU processing task for the client system 110, the master GPU server node will send a notification message to the checkpoint controller 626. In response, any new GPU service requests that are received by the GPU service controller 620 from the client system 110 will be temporarily stored in the request queue 624 for the client system 110 until the checkpointing operations associated with the currently queued and scheduled checkpoint request has been completed.

When the master GPU server node has completed its checkpointing operation for the currently detected "critical point" of the GPU processing task of the client system 110, and has received notification from all other slave GPU server nodes that the checkpointing operation on those nodes has been completed for the currently detected "critical point" of the GPU processing task, the local checkpointing results from each of the master and slave GPU server nodes will be physically or logically combined to generate a complete checkpoint image which corresponds to the currently detected "critical point" of the executing GPU processing task. The complete GPU checkpoint image will then be stored in one or more of the data storage nodes 140-1 and 140-2. A noted above, the GPU checkpoint image in this instance will be the complete API conversation and GPU memory image across the allocated GPU server nodes handling the execution of the GPU processing task of the client system 110.

The master GPU server node will send a notification message to the checkpoint controller 626 that the checkpointing operation is complete. In response, the checkpoint controller 626 will send a control message to the GPU server allocation and scheduling module 622 which indicates that the current checkpointing operation for the client system 110 is completed, and the GPU server allocation and scheduling module 622 will proceed to allocate and schedule any pending service requests of the client system 110 in the request queue 624.

The checkpointing solutions discussed above guarantee that the GPU service platform 610 will continue to execute GPU processing service requests from other client systems when a checkpointing operation is being performed for the client system 110. In addition, when a GPU processing task is being executed across multiple allocated GPU server nodes, the checkpointing operations are synchronized across GPU server nodes to ensure that a complete checkpoint image is generated at one time using the local checkpointing results from all the allocated GPU server nodes. To minimize network traffic, the local checkpointing results from a given GPU server node can be stored in a data storage node that is local to the given GPU server node, but logically associated with the local checkpointing results generated by other GPU server nodes. In this instance, when a client system requests access to a stored GPU checkpoint image, the local checkpoint images associated with the requested GPU checkpoint image can be access and separately transmitted to the client system, wherein the client system will combine the local checkpoint images to generate the complete image using information provided by the GPU server nodes.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   receiving, by a Graphics Processing Unit-as-a-Service (GPUaaS) cloud computing platform, a first service request from a first client system for GPU processing services provided by the GPUaaS cloud computing platform, wherein the GPUaaS cloud computing platform comprises a GPU server node and GPU checkpoint service controller, wherein the GPU server node comprises one or more GPU devices;
   executing, by the GPU server node, a first GPU processing task associated with the first service request received from the first client system using the one or more GPU devices of the GPU server node;
   receiving, by the GPUaaS cloud computing platform, a second service request from a second client system for GPU processing services provided by the GPUaaS cloud computing platform;
   executing, by the GPU server node, a second GPU processing task associated with the second service request received from the second client system, using the one or more GPU devices of the GPU server node; and
   performing, by the GPU checkpoint service controller, a GPU checkpointing operation for the first client system during execution of the first GPU processing task to generate a checkpoint image of a current state of the first GPU processing task;
   wherein the GPU server node continues executing the second GPU processing task using the one or more GPU devices concurrently with the GPU checkpoint service controller performing the GPU checkpointing operation for the first GPU processing task executing on the one or more GPU devices.

2. The method of claim 1, wherein performing the GPU checkpointing operation during execution of the first GPU processing task comprises:
   detecting, by the GPU server node, an occurrence of a predefined event in the execution of the first GPU processing task; and
   automatically initiating, by the GPU checkpoint service controller, the GPU checkpointing operation in response to the detected occurrence of the predefined event.

3. The method of claim 2, further comprising:
   recording, by the GPU server node, application programming interface (API) messages transmitted between the GPU server node and the first client system;

wherein performing the GPU checkpointing operation comprises:
  generating a checkpoint image of in-memory data stored in a memory device of the GPU server node, wherein the in-memory data represents the current state of the first GPU processing task; and
  storing the checkpoint image along with a copy of the recorded API messages exchanged between the first client system and the GPU server node in a data storage node.

4. The method of claim 2, wherein the predefined event comprises detecting a request from the first client system to send a copy of the current state of GPU memory from the GPU server node to a processing unit of the first client system.

5. The method of claim 2, wherein the predefined event comprises an expiration of a predetermined time interval for performing a checkpoint operation.

6. The method of claim 1, wherein performing the GPU checkpointing operation during execution of the first GPU processing task comprises:
  receiving, by the GPU server node, an explicit checkpoint command from the first client system;
  sending, by the GPU server node, a checkpointing tag to the first client system, which is utilized to identify a checkpoint image associated with the explicit checkpoint command; and
  scheduling, by the GPU server node, a time for commencing the GPU checkpointing operation.

7. The method of claim 6, wherein scheduling the time for commencing the GPU checkpointing operation comprises:
  storing, by the GPU server node, a checkpointing task in a global task queue maintained by the GPU server node;
  dispatching, by the GPU server node, the checkpointing task at the scheduled time for commencing the GPU checkpointing operation; and
  preventing, by the GPU server node, execution of other GPU processing tasks of the first client system on the one or more GPU device of the GPU server node during execution of the GPU checkpointing operation.

8. A method, comprising:
  receiving, by a graphics processing unit (GPU) service platform, a first service request from a first client system for GPU processing services provided by the GPU service platform, wherein the GPU service platform comprises a GPU server node, wherein the GPU server node comprises one or more GPU devices;
  executing, by the GPU server node, a first GPU processing task associated with the first service request using the one or more GPU devices;
  performing, by the GPU server node, a GPU checkpointing operation during execution of the first GPU processing task to generate a checkpoint image of a current state of the first GPU processing task; and
  executing, by the GPU server node, a second GPU processing task associated with a second service request received from a second client system, using the one or more GPU devices;
  wherein at least a portion of the second GPU processing task is executed by the GPU server node concurrently with performing the GPU checkpointing operation for the first GPU processing task;
  wherein executing the first GPU processing task associated with the first service request comprises allocating, by the GPU service platform, at least two GPU server nodes within a cluster of GPU server nodes to handle execution of the first GPU processing task; and
  wherein performing the GPU checkpointing operation comprises each of the at least two GPU server nodes performing a local checkpointing operation to generate a local checkpoint image of a current state of a respective portion of the first GPU processing task executing on that GPU server node, and combining the local checkpoint images to generate a complete checkpoint image of the current state of the first GPU processing task.

9. The method of claim 8, further comprising:
  storing, by the GPU service platform, an additional service request received from the first client system in a queue pending completion of the GPU checkpointing operation for the first client system; and
  sending, by the GPU service platform, the additional service request received from the first client system to one or more GPU server nodes that are allocated to handle the additional service request.

10. An article of manufacture comprising a processor-readable storage medium having stored program code of one or more software programs, wherein the program code is executable by one or more processors to implement method steps comprising:
  receiving, by a Graphics Processing Unit-as-a-Service (GPUaaS) cloud computing platform, a first service request from a first client system for GPU processing services provided by the GPUaaS cloud computing platform, wherein the GPUaaS cloud computing platform comprises a GPU server node and GPU checkpoint service controller, wherein the GPU server node comprises one or more GPU devices;
  executing, by the GPU server node, a first GPU processing task associated with the first service request received from the first client system using the one or more GPU devices of the GPU server node;
  receiving, by the GPUaaS cloud computing platform, a second service request from a second client system for GPU processing services provided by the GPUaaS cloud computing platform;
  executing, by the GPU server node, a second GPU processing task associated with the second service request received from the second client system, using the one or more GPU devices of the GPU server node; and
  performing, by the GPU checkpoint service controller, a GPU checkpointing operation for the first client system during execution of the first GPU processing task to generate a checkpoint image of a current state of the first GPU processing task;
  wherein the GPU server node continues executing the second GPU processing task using the one or more GPU devices concurrently with the GPU checkpoint service controller performing the GPU checkpointing operation for the first GPU processing task executing on the one or more GPU devices.

11. The article of manufacture of claim 10, wherein performing the GPU checkpointing operation during execution of the first GPU processing task comprises:
  detecting, by the GPU server node, an occurrence of a predefined event in the execution of the first GPU processing task; and
  automatically initiating, by the GPU checkpoint service controller, the GPU checkpointing operation in response to the detected occurrence of the predefined event.

12. The article of manufacture of claim 11, further comprising program code that is executable by the one or more processors to perform methods step of:

recording, by the GPU server node, application programming interface (API) messages transmitted between the GPU server node and the first client system;

wherein performing the GPU checkpointing operation comprises:

generating a checkpoint image of in-memory data stored in a memory device of the GPU server node, wherein the in-memory data represents the current state of the first GPU processing task; and storing the checkpoint image along with a copy of the recorded API messages exchanged between the first client system and the GPU server node in a data storage node.

13. The article of manufacture of claim 11, wherein the predefined event comprises at least one of (i) detecting a request from the first client system to send a copy of the current state of GPU memory from the GPU server node to a processing unit of the first client system and an expiration of a predetermined time interval for performing a checkpoint operation.

14. The article of manufacture of claim 10, wherein performing the GPU checkpointing operation during execution of the first GPU processing task comprises:

receiving, by the GPU server node, an explicit checkpoint command from the first client system;

sending, by the GPU server node, a checkpointing tag to the first client system, which is utilized to identify a checkpoint image associated with the explicit checkpoint command; and scheduling, by the GPU server node, a time for commencing the GPU checkpointing operation.

15. The article of manufacture of claim 14, wherein scheduling the time for commencing the GPU checkpointing operation comprises:

storing, by the GPU server node, a checkpointing task in a global task queue maintained by the GPU server node;

dispatching, by the GPU server node, the checkpointing task at the scheduled time for commencing the GPU checkpointing operation; and preventing, by the GPU server node, execution of other GPU processing tasks of the first client system on the one or more GPU device of the GPU server node during execution of the GPU checkpointing operation.

16. The article of manufacture of claim 10, wherein:

executing the first GPU processing task associated with the first service request comprises allocating, by the GPU service platform, at least two GPU server nodes within a cluster of GPU server nodes to handle execution of the first GPU processing task; and performing the GPU checkpointing operation comprises each of the at least two GPU server nodes performing a local checkpointing operation to generate a local checkpoint image of a current state of a respective portion of the first GPU processing task executing on that GPU server node, and combining the local checkpoint images to generate a complete checkpoint image of the current state of the first GPU processing task.

17. The article of manufacture of claim 16, further comprising program code that is executable by the one or more processors to perform method steps of:

storing, by the GPU service platform, an additional service request received from the first client system in a queue pending completion of the GPU checkpointing operation for the first client system; and sending, by the GPU service platform, the additional service request received from the first client system to one or more GPU server nodes that are allocated to handle the additional service request.

18. A Graphics Processing Unit-as-a-Service (GPUaaS) cloud computing platform, comprising:

a GPU checkpoint service controller;

a GPU server node comprising one or more GPU devices;

a memory configured to store program instruction; and at least one processor configured to execute the stored program instructions to perform a method comprising:

receiving, by the GPUaaS cloud computing platform, a first service request from a first client system for GPU processing services provided by the GPUaaS cloud computing platform;

executing, by the GPU server node, a first GPU processing task associated with the first service request received from the first client system using the one or more GPU devices;

receiving, by the GPUaaS cloud computing platform, a second service request from a second client system for GPU processing services provided by the GPUaaS cloud computing platform;

executing, by the GPU server node, a second GPU processing task associated with the second service request received from the second client system, using the one or more GPU devices of the GPU server node; and performing, by the GPU checkpoint service controller, a GPU checkpointing operation during execution of the first GPU processing task to generate a checkpoint image of a current state of the first GPU processing task;

wherein the GPU server node continues executing the second GPU processing task using the one or more GPU devices concurrently with the GPU checkpoint service controller performing the GPU checkpointing operation for the first GPU processing task executing on the one or more GPU devices.

19. The GPUaaS cloud computing platform of claim 18, wherein performing the GPU checkpointing operation during execution of the first GPU processing task comprises:

recording application programming interface (API) messages transmitted between the GPU server node and the first client system;

detecting an occurrence of a predefined event in the execution of the first GPU processing task; and automatically initiating the GPU checkpointing operation by the GPU checkpoint service controller in response to the detected occurrence of the predefined event;

wherein performing the GPU checkpointing operation comprises:

generating a checkpoint image of in-memory data stored in a memory device of the GPU server node, wherein the in-memory data represents the current state of the first GPU processing task; and storing the checkpoint image along with a copy of the recorded API messages exchanged between the first client system and the GPU server node in a data storage node.

20. The GPUaaS cloud computing platform of claim 18, wherein performing the GPU checkpointing operation during execution of the first GPU processing task comprises:

receiving an explicit checkpoint command from the first client system;

sending a checkpointing tag to the first client system, which is utilized to identify a checkpoint image associated with the explicit checkpoint command; and scheduling a time for commencing the GPU checkpointing operation, wherein scheduling the time for commencing the GPU checkpointing operation comprises:

storing a checkpointing task in a global task queue maintained by the GPU server node;

dispatching the checkpointing task at the scheduled time for commencing the GPU checkpointing operation; and preventing execution of other GPU processing tasks of the first client system on the one or more GPU device of the GPU server node during execution of the GPU checkpointing operation.

* * * * *